United States Patent [19]
Bealor, Jr.

[11] 3,757,287
[45] Sept. 4, 1973

[54] SEA BOTTOM CLASSIFIER

[75] Inventor: Jesse L. Bealor, Jr., Panama City, Fla.

[73] Assignee: The United States of America as represented by the Secretary of the Navy

[22] Filed: Apr. 6, 1972

[21] Appl. No.: 241,634

[52] U.S. Cl.................................. 340/3 R, 340/3 T
[51] Int. Cl................................................ G01s 9/66
[58] Field of Search ........................... 340/3 R, 3 T; 181/0.5 NP

[56] References Cited
UNITED STATES PATENTS
3,478,308   11/1969   Stanley et al. ..................... 340/3 R

*Primary Examiner*—Richard A. Farley
*Attorney*—Richard S. Sciascia et al.

[57] ABSTRACT

A sea bottom classifier is disclosed as including a first transmitter and transducer for broadcasting sonic signals with a predetermined directivity pattern toward the sea bottom at a given first grazing angle and a second transmitter and transducer for broadcasting sonic signals with a predetermined directivity pattern toward said sea bottom at a second grazing angle that is different from said first grazing angle. A pair of receivers receive the echoes of said sonic signals after they have been reflected from the sea bottom, and data processing and computer systems are employed to time the aforesaid first and second broadcasting of sonic signals in such manner that the echoes thereof are reflected from the same spot on said sea bottom and subsequently simultaneously received by said pair of receivers, regardless of the distance said transducers are from said sea bottom or the relative velocity therebetween. A subtract circuit and a signal averaging circuit are employed to smooth the output signals from said receivers, and a readout, preferably calibrated in terms of sea bottom hardness and composition, is employed to indicate and/or record the sea bottom characteristics being sampled at any given instant.

18 Claims, 5 Drawing Figures

FIG.2

SEA BOTTOM CLASSIFIER

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to material analyzers and, in particular, is an instrument for rapidly and continuously probing, measuring, and indicating the composition, physical characteristics, and hardness of the sea floor and sub-sea floor.

DESCRIPTION OF THE PRIOR ART

Heretofore, several prior art methods and means have been employed to determine sea floor characteristics, and for many practical purposes, they have been eminently satisfactory. However, for many practical purposes, they also leave considerable room for improvement.

One example of said prior art methods and means is the extraction of cores from the sea floor by conventional core cutting apparatus. So doing, of course, was laborious, time consuming, expensive and usually required the working of highly skilled personnel and the employment of specially built ships or other large platform type vehicles. Moreover, one such a sea floor core was extracted and hauled to the surface, it then had to be analyzed both chemically and physically, in order to determine relative hardness and the composition of materials effecting such hardness.

Another example of such prior art methods and means for ascertaining sea floor hardness and composition is to use a depth sounder to actively broadcast sonic pulses toward the sea floor, receive the echo signals therefrom, and process said echo signals in such manner as to measure the extent to which they were elongated relative to a known reference parameter. Though satisfactory for many situations, the apparatus for so doing is quite complex and requires operators having a considerable degree of expertise in the technology thereof, in order to obtain the results desired therefrom.

Another technique of determining sea floor hardness and composition has involved the creation of mathematical models from measurements of sound velocity of sediment cores taken from the ocean floor and then calculate the attenuation of a given sound wave occurring in said sediment cores. Again, such procedure is difficult to employ and is exceedingly time consuming. Furthermore, such procedure cannot ordinarily be implemented in situ; thus, while so doing may provide generally accurate information, the expense involved is ordinarily too great to be practical for any but highly specialized situations.

From the foregoing, it may readily be inferred that improvements in the methods and means for analyzing sea floor hardness and corresponding composition are welcome, indeed, by the artisans involved therewith. The subject invention, thus, makes a contribution toward advancing the state of the art, inasmuch as it overcomes many of the disadvantages of the prior art.

SUMMARY OF THE INVENTION

Briefly, the subject invention comprises a bottom following underwater vehicle which includes several transceivers so arranged along the length thereof as to receive and measure the backscattering echoes of previously broadcast acoustical signals from substantially the same spot on the sea floor at a plurality of grazing angles. The resulting echo signals are then processed to determine the relative strengths thereof for said grazing angles by means of difference networks and averaging circuitry. The output signal from the averaging circuitry is an analog signal that is proportional to sea floor hardness, with the greater the magnitude thereof corresponding to the harder sea floor composition. Of course, as will be explained more fully below, it has been empirically determined that, as hardness of the sea floor increases, the composition thereof changes from mud-to-silt-to-sand-to-gravel-to-rock, etc. Hence, the aforesaid analog signal level may be read out in terms of either hardness or composition or both.

If so desired, the aforementioned underwater vehicle may be a constant altitude following vehicle, in which case the transducer may be mounted rigidly thereof. On the other hand, it may be a variable altitude vehicle, in which case the directivities and broadcast timing of the transducers are continuously controlled to insure that they receive echo signals from essentially the same spot on the sea floor, regardless of the distance therebetween.

It is, therefore, an object of this invention to provide an improved sea bottom classifier.

Another object of this invention is to provide an improved method and means for determining the hardness and composition of a material, such as a sea floor, a river bottom, an estuary bottom, a lake, or any other substance.

It is still another object of this invention to provide an improved method and means for detecting and classifying various and sundry objects laying on, partially buried in, or completely buried in a sea floor, river bottom, bay bottom, or floor of other waterways.

Still another object of this invention is to provide an improved instrument for continuously analyzing the hardness and constituents of objects or other earth materials, even though they may not be covered by water.

Another object of this invention is to provide an improved oceanographic instrument for measuring various and sundry submarine parameters from a position relatively remote therefrom or from a position contiguously disposed therewith.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figures 1, 3, 4, 5:
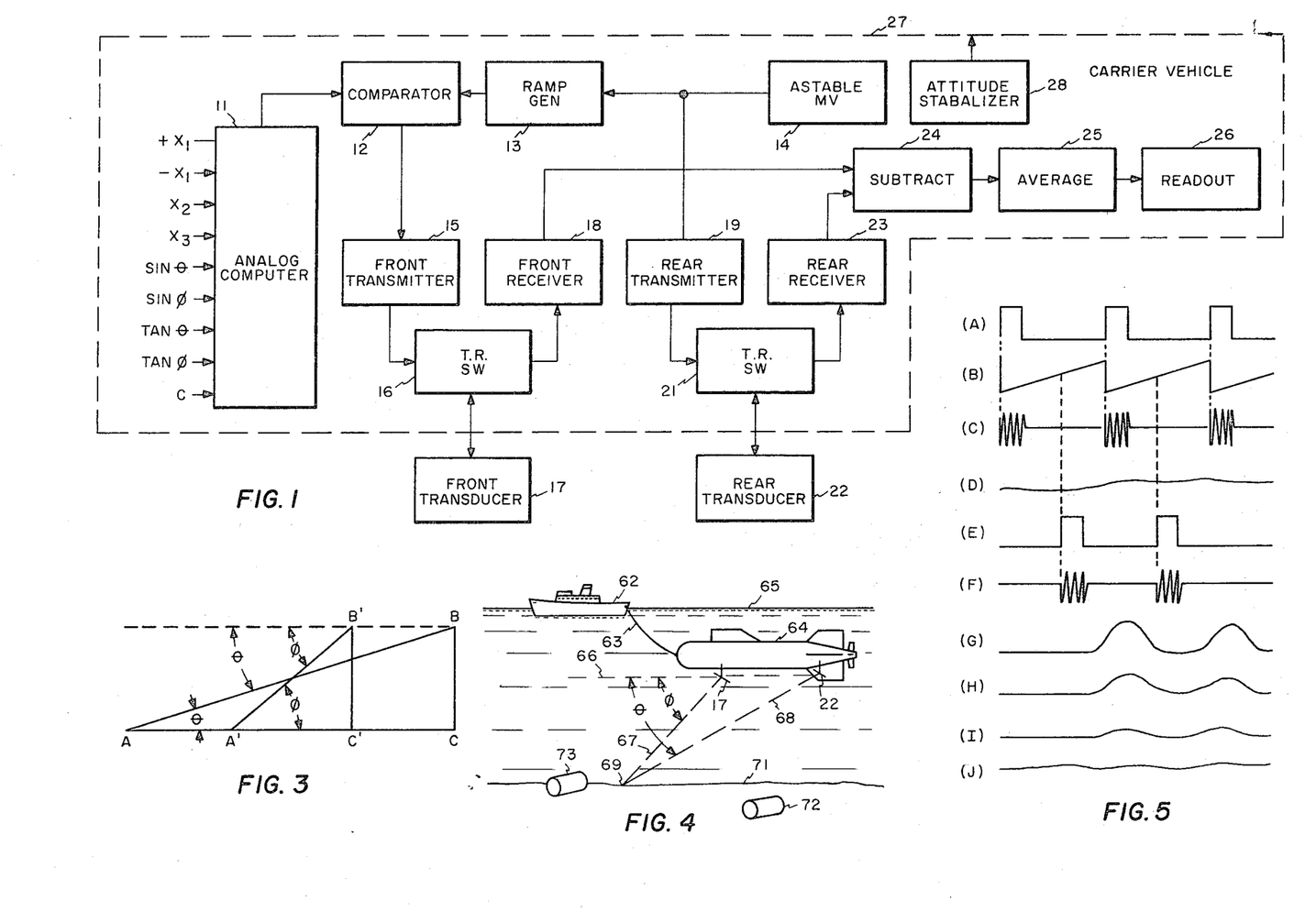
FIG. 1 is a block diagram of the material and object classifier system constituting the subject invention.
FIG. 3 is schematic diagram which will be used during the explanation of the theory of operation of the invention.
FIG. 4 is a quasi-pictorial view depicting a typical operation of the invention.
FIG. 5 is a graphical representation of the signal waveforms occurring at the outputs of the various components of the system of FIG. 1.

Referring now to FIG. 1, the subject invention is disclosed as containing an analog computer 11 having a plurality of input signals supplied thereto. Said input signals and the various interrelated components of analog computer 11 will be explained more fully below in conjunction with FIG. 2. Suffice to say at this time that said analog computer 11 constitutes a means for compensating for variations that ordinarily occur because the transport means for the entire invention may not be completely stabilized nor accurately controlled from the altitude, attitude, and speed standpoints during the normal operation thereof. For the purpose of optimizing such compensations, computer 11 is particularized in a unique manner, so as to facilitate the cooperation thereof with the remaining components of the system of FIG. 1.

The output of analog computer 11 is connected to one of the inputs of an adjustable voltage comparator 12, the other input of which is connected to the output of an adjustable amplitude ramp voltage generator 13. The input of ramp generator 13 is connected to the output of an adjustable frequency but free-running, astable multivibrator 14.

The output of comparator 12 is connected to the input of a tunable front transmitter 15, the output of which is coupled to the input of a transmit-receive (TR) switch 16, with the output thereof, in turn, connected to the input of a reversible transducer 17 during the broadcast mode of operation. During the receive mode of operation, the output of transducer 17 is connected to the input of said transmit-switch 16, and at that time, the output thereof is connected to the input of a tunable front receiver 18.

The output of the aforesaid astable multivibrator 14 is also connected to the input of a tunable rear transmitter 19, and the output thereof is connected to the input of a transmit-receive (TR) switch 21 during the broadcast mode of operation. At that time, the output thereof is also connected to the input of a rear transducer 22. During the receive mode of operation, the output of transducer 22 is connected to the input of transmit-receive switch 21, and the output thereof is connected to the input of a tunable rear receiver 23.

Transmit-receive switches 16 and 21 are, of course, conventional in the art and, thus, block reception at the time of broadcast and vice versa in the well known conventional manner.

At this time, it would perhaps be noteworthy that the instant invention is subject to being used within a number of different environmental mediums. Accordingly, the aforementioned transmitters, receivers, and transducers, etc., should be so designed as to be compatible with whatever environmental medium and application are intended. Obviously, so doing would be well within the purview of one skilled in the art having the benefit of the teachings presented herewith.

Moreover, as will be discussed more fully subsequently, transducers 17 and 22 are spatially disposed from one another in such manner that the distance therebetween would be best for the environmental medium involved, the transport means employed, and the speed of travel thereof. Furthermore, although not specifically shown in the generic embodiment of FIG. 1, transducers 17 and 22 are positioned in such manner at different angles $\phi$ and $\theta$ with respect to the horizontal, so as to have different "grazing" angles with the surface of the material being analyzed, as also will be explained in greater detail subsequently.

The outputs of front and rear receivers 18 and 23 are respectively connected to the inputs of a subtract circuit 24, with the output thereof connected to a voltage averaging circuit 25 for signal smoothing purposes. The output of averaging circuit 25 is connected to any suitable readout 26, which is preferably calibrated in such terms as will best indicate the composition parameters desired to be obtained.

In FIG. 1, the foregoing classifier system is shown as being mounted on or in a carrier vehicle 27. At this time, it should be understood that carrier vehicle 27 may be such as would facilitate the analyzing and classifying any particular substance or substances. It may be stationary or mobile, it may be large or small, and, if mobile, it may be fast or slow. In addition, as previously suggested, it may be of any type that will operate in any given ambient medium. Hence, for example, vehicle 27 may be a fixed platform, a ship or other marine vehicle, a self-propelled or towed submarine vehicle, an aircraft, a space craft, a land vehicle, a human being, or the like. Again, the selection of the proper design therefor would be obvious to the artisan making and using the invention from the teachings presented herein.

Although the scope of the instant invention is not intended to be limited to any particular environmental medium or to analyzing any particular material, for the purpose of keeping this disclosure as simple as possible, it will be disclosed in detail as being a system that is carried by an underwater vehicle for the purpose of effectively sampling, analyzing, and classifying the hardness of the sea floor and for inferring the probable composition thereof therefrom.

Although the system described so far will operate with sufficient accuracy to be practical within limits without any carrier vehicle stabilization, if the greatest possible accuracy is to be obtained, carrier vehicle 27 should be a stabilized platform, in effect, at least to the extent that most of the pitch component thereof has been deleted. So stabilizing it causes the front and rear transducers to be disposed along an imaginary axis that is substantially horizontal with respect to the earth. Of course, under such circumstance, when the directivity patterns of the front and rear transducers are adjusted to converge at the same spot on the sea floor being sampled, their angles $\theta$ and $\phi$ respectively made therewith are the same as $\theta$ and $\phi$ respectively made with the aforesaid imaginary axis, inasmuch as, at that time, they become complementary angles. Hence, in the event the accuracy provided by carrier vehicle stabilization is desired, any conventional (gyroscopic or other) platform stabilizer — that is, one that stabilizes in pitch or in pitch, yaw, and roll — may be incorporated as part of the entire system constituting this invention. Accordingly, an attitude stabilizer 28 is connected to carrier vehicle 27 for such purpose.

The system of FIG. 1 shows the instant invention as containing only two electroacoustical transducers and, thus, only taking two sea floor samples at any given location thereon. Nevertheless, it should be understood that any plurality thereof may be employed, if so desired. Of course, there are practical limits within which the invention should be structured, but, as a general rule, the more transducers employed, the greater the accuracy of the sampling process. Hence, if suitable grazing angles were used that would optimize the sampling process, any number of transducers (and associated circuitry) may be used to broadcast and receive the sampling energy.

Figure 2:
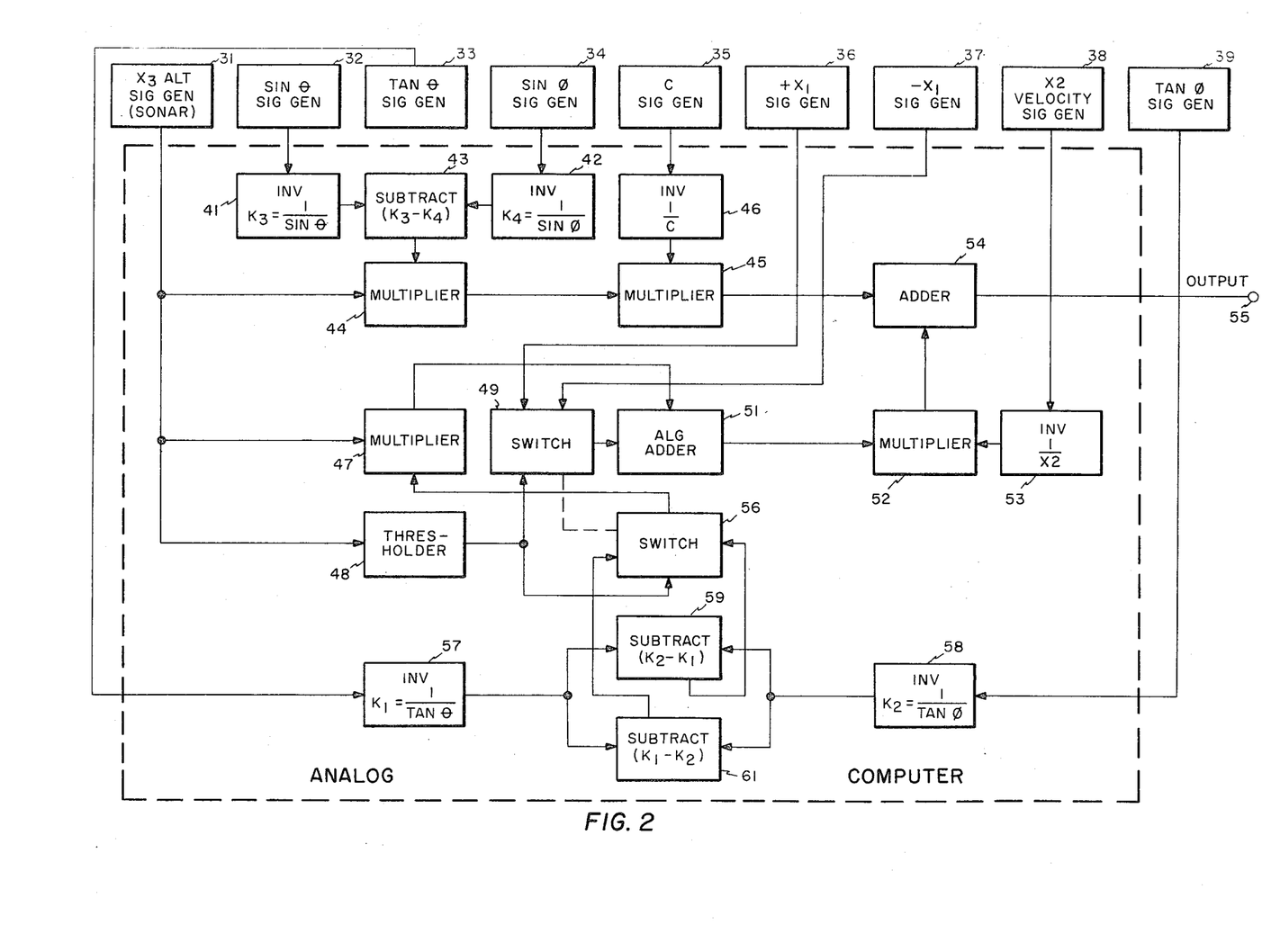
FIG. 2 is a detailed block diagram of the analog computer of the system of FIG. 1.

As previously indicated, a preferred embodiment of analog computer 11 is illustrated in FIG. 2. However, in order for said computer 11 to be functional, a plurality of signals must be supplied thereto, each of which correspond in analog fashion to one of the physical parameters that require electronic manipulation for the purpose of compensating for their respective irregularities at any given point in time, due to the varying ambient forces — natural and unnatural — being applied thereto from time to time during normal operating conditions. Accordingly, said plurality of signals are hereby listed and defined as follows:

A first voltage signal is required that represents the altitude or distance of electroacoustical transducers 17 and 22 above the sea floor at any given instant. Such signal is preferably obtained by using a conventional range or depth finding sonar as an altitude signal generator 31.

The second voltage signal that is required is one that represents the sine of angle $\theta$ — that is, the sine of the angle the directivity pattern of the rear transducer makes with the imaginary axis between the front and rear transducers. Because angle $\theta$ remains constant, the voltage signal representing the sine thereof is produced by a sin $\theta$ generator 32 and remains constant, too.

The third voltage signal that is required is one that represents the tangent of angle $\theta$, wherein $\theta$ is defined as above. It is produced by a tan $\theta$ signal generator 33.

The fourth voltage signal that is required is one that represents the sine of angle $\phi$ — that is, the sine of the angle the directivity pattern of the front transducer makes with the aforesaid imaginary axis between the front and rear transducers. Like angle $\theta$, angle $\phi$ remains constant and, thus, the voltage signal representing the sine thereof is produced by a sin $\phi$ generator 34.

The fifth voltage signal that is required is one which represents the velocity of sound in the environmental medium involved, herewith considered to be the velocity of sound (C) in water for the embodiment presently under discussion. It is produced in analog fashion by a C signal generator 35.

The sixth voltage signal that is required is one that represents the distance between the front and rear transducers. It is produced by a $+X_1$ signal generator 36.

The seventh voltage signal that is required is one that also represents the distance between the front and rear transducers. The magnitude thereof is identical to that of the aforesaid $+X_1$ signal, but the polarity (or sign) thereof is negative for reasons which will be made clear subsequently. Thus, a $-X_1$ voltage is produced by a $-X_1$ signal generator 37.

The eighth voltage signal that is required is one that represents the velocity at which the aforementioned first and second transducers are traveling over the material being analyzed, in this particular instance, the sea floor. Of course, said velocity is relative, in that it is the velocity between said transducers and said material, regardless of whether either one or both thereof are moving, say, with respect to the earth. Moreover, said voltage will vary with said velocity. Accordingly, it is produced by an $X_2$ velocity signal generator 38, which may include any appropriate velocity measuring device.

The ninth voltage signal that is required is one that represents the targent of angle $\phi$ which, of course, is the same angle $\phi$ as was defined above. It is produced by a tan $\phi$ signal generator 39.

All of the aforementioned signal generators 31 through 39 are conventional in the art, and, hence, the construction thereof would be obvious to the artisan. Therefore, no further detailed disclosure thereof is deemed necessary. Of course, it should also be obvious that although they are necessary to the working of the invention, they could also be considered as being ancillary thereto, again the design choice with respect thereto remaining with the artisan having the benefit of the teachings presented herewith.

Furthermore, it would perhaps be noteworthy at this time that each of said signal generators 31 through 39, if desired, could be designed to be variable or adjustable, so that they could be adjusted by a human operator or other utilization apparatus (not shown), in order to expedite the proper performance thereof during any given operational circumstances.

Moreover, in the event the attitude, altitude, and speed of the vehicle carrying the subject system is controlled or regulated by other apparatus (not shown) not a part of this invention — say, for example, by a human or automatic pilot — then some of said signal generators would not be needed to produce analog signals, because they, in effect, would be simulated by such apparatus.

As previously mentioned, the aforesaid input signals are respectively supplied to various and sundry components of analog computer 11, which will now be discussed in greater detail.

The output of the aforesaid sin $\theta$ signal generator 32 is connected to the input of an inverter 41 which performs the function $K_3 = 1/\sin \theta$. The output of the aforesaid sin $\phi$ signal generator 34 is connected to the input of an inverter 42 which performs the function $K_4 = 1/\sin \phi$. The outputs of inverters 41 and 42 are connected to the inputs of a subtract circuit 43 which, in turn, performs the function of subtracting $K_4$ from $K_3$. The output of subtract circuit 43 is connected to one of the inputs of the multiplier 44, the output of which is connected to one of the inputs of another multiplier 45. C signal generator 35 has its output connected to the input of an inverter 46 which thus performs the function of 1/C, the output of which is connected to the other input of the aforementioned multiplier 45.

The output of altitude signal generator 31 is connected to the remaining input of multiplier 44, as well as to one of the inputs of a multiplier 47 and the input of an adjustable thresholder 48.

$+X_1$ signal generator 36 has the output thereof connected to one of the data inputs of a selector switch 49, and $-X_1$ signal generator 37 has the output thereof connected to the other data input of said selector switch 49. The data output of selector switch 49 is connected to one of the inputs of an algebraic adder circuit 51, with the other input thereof connected to the output of the aforesaid multiplier 47. The output of algebraic adder 51 is connected to one of the inputs of a multiplier 52, the other input of which is connected to the output of an inverter 53. Since the input of said inverter 53 is connected to the output of the aforementioned $X_2$ velocity signal generaor 38, it performs the function of $1/X_2$. The output of multiplier 52 is connected to one of the inputs of an adder circuit 54, the other input of which is connected to the output of the aforesaid multiplier 45. The output of adder 54 is connected to a T output terminal 55, which constitutes the output of analog computer 11.

The output of the aforementioned thresholder 48 is connected to the remaining input of switch 49 which, in this particular instance, constitutes the control input thereof. The output of thresholder 48 is also connected to the control input of a selector switch 56 which is ganged with the aforesaid switch 49, so as to provide switching synchronism therebetween. The output of selector switch 56 is connected to the remaining input of the aforesaid multiplier 47.

Previously mentioned tangent $\theta$ signal generator 33 has the output thereof connected to the input of an inverter 57, which performs the function $K_1 = 1/\tan\theta$, and the output of previously mentioned tangent $\phi$ signal generator 39 is connected to the input of another inverter 58, which performs the function $K_2 = 1/\tan\phi$. The output of inverter 57 is connected to one of the inputs of each of a pair of subtract circuits 59 and 61, and the output of inverter 58 is connected to the other inputs of each of said subtract circuits 59 and 61. The purpose of subtract circuit 59 is to perform the function of subtracting signal $K_1$ from signal $K_2$, and the purpose of subtract circuit 61 is to perform the function of subtracting signal $K_2$ from signal $K_1$; hence, they should be respectively designed accordingly. The output of subtract circuit 59 is connected to one of the data inputs of the aforesaid switch 56, and the output of switch 61 is connected to the other data input thereof.

As previously indicated, switches 49 and 56 are ganged together in such manner as to be operated with a predetermined synchronization. In actual practice, however, said switches are merely intermediaries for the respective correlations of the $+X_1$ signal generator 37 output with the $K_2-K_1$ subtract circuit 59 output and of the $-X_1$ signal generator 36 output with the output of $K_1-K_2$ subtract circuit 61. Such synchronizations are effected within analog computer 11 as a result of their timely occurrence within multiplier 47, selector switches 49 and 56, and algebraic adder 51, the latter of which performs the algebraic addition of either the $+X_1$ or $-X_1$ signals effectively supplied thereto through said switch 49 to the output signal of multiplier 47, depending on the altitude of the carrier vehicle.

It would perhaps be noteworthy at this time that all of the components indicated in block form in FIGS. 1 and 2 are well known and conventional per se. Therefore, it is to be understood that it is their unique interconnections and interactions which produce the sea bottom classifier constituting this invention and the improved results effected thereby.

The diagram of FIG. 3 will be discussed later during the discussion of the theory of operation of the invention.

Referring now to FIG. 4, there is shown, in schematic pictorial form, one mode of operation of the subject invention. Said mode of operation, of course, is not illustrated by way of limitation but, instead, is merely shown as being a preferred mode of operation, with numerous other modes of operation available to the artisan, if he so desires.

Depicted in FIG. 4 is a tractor vehicle, such as a ship 62, or the like, which by means of cable 63 tows an underwater vehicle 64 within sea water 65. Of course, the subject system comprising the components of FIGS. 1 and 2 are disposed within underwater vehicle 64, with the exceptions of front and rear transducers 17 and 22 which, in this particular instance, are shown as being suspended therefrom.

As previously indicated, an imaginary axis 66 may be drawn between said front and rear transducers 17 and 22, and, thus, angle $\phi$ is shown as existing between directivity pattern 67 of transducer 17 and said imaginary axis 66, while angle $\theta$ is shown as being the angle between the directivity pattern 68 of transducer 22 and said imaginary axis 66. As may readily be seen, the directivity patterns of front and rear transducers 17 and 22 impact at a sampling spot 69 on sea floor 71. As will be explained more fully subsequently, the impact thereof at spot 69 on sea floor 71 is effected as a result of the attitude, altitude, and speed parameters of underwater vehicle 64 being appropriately computed within computer 11 for the purpose of effecting whatever compensation therefor, in the form of relative broadcast delays, as are necessary to effect said directivity pattern samplings.

As in the case with most sea floors, river bottoms, lake bottoms, estuary floors, and other substances, including those which are both man made and natural, which the instant invention is capable of analyzing, the composition or substance of sea floor 71 may vary in physical characteristics, such as, for example, in hardness, in materials, or any combination thereof. Furthermore, it is not unlikely that during the mode of operation depicted in FIG. 4 that various and sundry objects 72 and 73 buried in or laying on sea floor may be acquired by the directivity patterns of front and rear transducers 17 and 22. Of course, at such time, such anomalies as those items would respectively provide would be indicated by the subject invention in the manner explained further during the discussion of the operation thereof presented below.

THEORY OF OPERATION

For the purpose of presenting mathematical proof of the unique operability of the subject invention, one of the simplest cases will be used — that schematically illustrated in FIG. 3 — and the following hypotheses will be presumed:

$BC = B'C' =$ the altitude of the transducers above the sea floor, which is such distance as to cause the directivity pattern of the rear transducer to strike the sea floor a distance $AA'$ in front of the place where the directivity pattern of the front transducer strikes the sea floor;

$B'B = C'C =$ the distance between transducers;

$\theta =$ the grazing angle that the directivity pattern of the rear transducer makes with the sea floor, and it is complementary to the angle $\theta$ between said rear transducer directivity pattern and an imaginary axis extending through $B'$ and $B$ — the front and rear transducers;

$\phi =$ the grazing angle that the directivity pattern of the front transducer makes with the sea floor, and it is complementary to the angle $\phi$ between said front transducer directivity pattern and said imaginary axis extending through $B'$ and $B$ — the front and rear transducers.

Then $$A'C' = B'C'/\tan \phi \qquad (1)$$

and $$AC = BC/\tan \theta \qquad (2)$$

and $$AA' = AC - (A'C' + C'C) \qquad (3)$$

$$AA' = BC(1/\tan \theta) - B'C'(1/\tan \phi) - C'C. \qquad (4)$$

Then let $$K_1 = 1/\tan \theta \qquad (5)$$

and $$K_2 = 1/\tan \phi \qquad (6)$$

Since $BC = B'C'$, $$AA' = BC(K_1 - K_2) - X_1 \qquad (7)$$

where $$X_1 = C'C. \qquad (8)$$

The time required for the carrier vehicle - such as carrier vehicle 27 — to move from A' to A is $$t_1 = AA'/V_1, \qquad (9)$$

where $V_1$ is the forward velocity of said carrier vehicle.

In this particular case, in order for the directivity patterns of both front and rear transducers to impact or graze on the same spot on the sea floor — a necessary and important situation which must occur, if the invention is to work properly, since the accuracy of the operation is predicted thereon — a delay $(t_1)$ must be effected between the transmission from the rear transducer (B) and the front transducer (B'). Hence, the total time required for transmission from transducer B' with respect to transducer B is expressed by:

$$T = t_1 + t_2, \qquad (10)$$

where T is the total time delay required between rear and front transmissions (or vice versa, as the case may be) to make the directivity patterns thereof converge on the same spot on the sea floor for any given altitude, where $t_1$ is the delay given above, and $t_2$ is the delay required because $$AB \ne A'B'. \qquad (11)$$

But, $$AB = BC/\sin \theta \qquad (12)$$

and $$A'B' = B'C'/\sin \phi. \qquad (13)$$

Let $$K_3 = 1/\sin \theta$$

and $$K_4 = 1/\sin \phi. \qquad (14)$$

Then, because in this particular constant altitude case, $BC = B'C'$, $$AB - A'B' = BC(K_3 - K_4). \qquad (15)$$

But, $$t_2 = BC(K_3 - K_4)/C, \qquad (16)$$

where C is the velocity of the broadcast energy through the environmental medium — in this case, the velocity of sound in water. Then $$T = t_1 + t_2 = AA'/V_1 + BC(K_3 - K_4)/C \qquad (17)$$

$$= [BC(K_1 - K_2) - X_1/V_1] + [BC(K_3 - K_4)/C] \qquad (18)$$

where $X_1 = C'C$,
or $T = BC[C(K_1 - K_2) + V_1(K_3 - K_4)] - CX_1/V_1C \qquad (19)$ From the foregoing, it may readily be seen that when total delay time T is incorporated in the sequence of transducer broadcasts — that is, when the rear transducer is made to broadcast first in this particular case by an amount of time T — the same grazing spot will be impacted or grazed by the sonic energy from each of the front and rear transducers and, therefore, the appropriate acoustical sampling thereof is effected.

In a similar manner, it can be proven that $T = BC[C(K_2 - K_1) + V_1(K_3 - K_4)] + CX_1/V_1C \qquad (20)$ whenever $B'C' = BC$ but the front and rear transducers are of such distance above the sea floor as, without incorporation of delay T, would cause the directivity pattern of the front transducer to strike the sea floor some distance in front of the place where the directivity pattern of the rear transducer strikes the sea floor. Thus, under such circumstances, it may be seen that if the broadcast of the front transducer is delayed a time T, as calculated by equation (20), the same sea floor spot will be acoustically sampled.

Obviously, numerous different time delay requirement cases could occur during the normal operation of the instant invention; however, mathematical proof of others thereof is not presented at this time because they are substantially similar to that presented above and, thus, they would unduly extend the length of this disclosure beyond that which is necessary to the understanding of the invention by the artisan. Accordingly, the above is deemed to suffice to prove that the system constituting this invention effectively samples the same spot on the sea floor, regardless of the altitude of the carrier vehicle above it.

As previously suggested, the operation of this invention is based on the principle that energy scattering is a function of material and grazing angle. Thus, the disclosed preferred embodiment of this invention is likewise predicated on the principle that acoustical energy scattering from a sea bottom is a function of the type of sea bottom being encountered and the grazing angle of the incident acoustical energy. This characteristic has been determined and, as a result, it has been, in turn, determined that, for most practical purposes, the bottom scattering strength in db increases in accordance with certain curves having a certain magnitude, as the hardness of the sea floor increases. In addition, it has been determined that a family of such curves can be drawn — using bottom scattering strength as the ordinant and grazing angles as the abscissa of the coordinants therefor — with the magnitudes thereof indicative of the substance or composition thereof. For example, it has been ascertained that a mud bottom is softer than a sand bottom which is softer than a gravel bottom. Hence, the magnitudes of the bottom strengths thereof increase as independent but family-related functions, respectively. Thus, it may be said that the larger the bottom scattering strength of an acoustical signal received after being reflected therefrom, the larger the composition elements and the harder the substance comprising said composition elements. Within practical limits, it is, likewise, the same for grazing angles — that is, the larger the grazing angle the larger the bottom scattering strength of a sonic signal reflected therefrom and to some extent the greater the slope of the curve for any particular sea floor substance for any given bottom scattering strength.

By means of the instant invention, when it is properly adjusted and calibrated to make intelligent use of the aforesaid principles, a relatively good indication of the substance, hardness, and perhaps other physical characteristics can be ascertained either from a position contiguous therewith or remote therefrom.

MODE OF OPERATION

The operation will now be discussed briefly in conjunction with all of the figures of the drawing.

Referring first to FIG. 4, generally speaking, tractor ships 62 tows underwater vehicle 64 by means of tow cable 63. As desired, vehicle 64 may be manned or unmanned. Also, as desired, cable 63 may be a telemetering cable, as well as a tow cable.

As vehicle 64 is towed over the sea bottom intended to be classified, astable multivibrator 14 produces a signal containing periodic pulses, as shown in FIG. 5(A). Said pulses initiate the ramp cycles of ramp generator 13, so as to timely produce the sawtooth signals of FIG. 5(B). At the same time, in response to the pulses of the signal of FIG. 5(A), rear transmitter 19 is activated, thereby causing rear transducer 22 to broadcast a CW signal of predetermined frequency, as depicted in FIG. 5(C) at angle $\theta$. The frequency of the CW signals of FIG. 5(C) is determined by the frequency at which transmitter 19 is tuned, and, of course, transmitter 19 may be adjusted to whatever would be an optimum frequency for any given operational conditions.

The signal waveform illustrated in FIG. 5(D) represents the T voltage which is produced by analog computer 11, as a result of mathematically taking into consideration the aforementioned $+X_1$, $-X_1$, $X_2$, $X_3$, $\sin \theta$, $\sin \phi$, $\tan \theta$, $\tan \phi$, and C analog signals from generators 31 through 39, respectively.

Ostensively, the computations made by computer 11 are straightforward and self-evident from the portrayal thereof presented in FIG. 2. Hence, ostensively it would suffice to say that it simply performs the mathematical functions of either of the aforesaid equations (19) or (20), depending on the particular altitude above the sea floor that is intended.

With respect to said equations (19) and (20), it may be readily seen that three possible altitude situations could occur as follows:

1. The situation where the altitude is great enough for the directivity pattern of the rear transducer to cross over the directivity pattern of the front transducer (as shown in FIG. 3 and defined in detail mathematically above), whereby the rear directivity pattern would contact the sea floor at a spot in front of the spot where the front directivity pattern would contact it were it not for the compensation therefor effected by computer 11;

2. The situation where the altitude is such that the directivity patterns of the front and rear transducers would converge at the same spot of contact with the sea floor — a situation that is highly unlikely, except for an instant in time during cross-over;

3. The situation where the altitude is small enough for the directivity pattern of the front transducer to remain in front of the directivity pattern of the rear transducers, whereby the front directivity pattern would contact the sea floor at a spot in front of the spot where the rear directivity pattern would contact it were it not for the compensation therefore effected by computer 11.

Of course, as previously suggested, sonar altitude signal generator 31 in combination with thresholder 48 effects the shifting to the using of the function of equation (19) in the aforementioned first situation, as a result of thresholder 48 being able to discriminate between the intensities of altitude signals from generator 31 within reasonable limits and supply a switching signal to the control input of selector switches 49 and 56. Hence, the total time delay (T) necessary to make both front and rear transducer patterns sample the same sea floor spot during such situation is effected, regardless of the speed of the carrier vehicle. Likewise, shifting to the using of the function of equation (20) is implemented by the switching of switches 49 and 56 in the opposite direction by thresholder 48 and sonar altitude signal generator 31, so as to provide compensation in the form of time delay (T) as necessary in the aforementioned third situation. As may readily be seen from FIG. 2, the $K_1-K_2$ and the $-X_1$ terms occur in equation (19) in the aforementioned first situation, and the $K_2-K_1$ and $+X_1$ terms occur in equation (20) in the aforementioned third situation, with the aforementioned second situation being the shift or attitude crossover situation for any given transducer angles.

As may readily be inferred from computer 11 and the analog signals supplied thereto, all except two of said input analog signals are ordinarily fixed in voltage for any given sea floor sampling and, therefore, T only varies with the velocity of the carrier vehicle ($X_2$) and the altitude of the carrier vehicle ($X_3$) signals, which are the variables — but, of course, the controllable variables, as previously indicated.

As a general rule, once the sampling traverse has begun, the attitude and speed of carrier vehicle 27 stays substantially constant in the horizontal direction. Also, within limits, the altitude of it above the sea bottom remains about the same, perhaps with slight deviations occurring as a result of underwater currents or wave actions and other unknown ambient forces applied thereto. Accordingly, the waveform of FIG. 5(D) is shown as having a very slight curve in it, so as to make it representative of the delay T voltage signal that would occur at the output of computer 11 if it contained said possible slight altitude deviations.

As the delay T voltage from computer 11 compares or coincides in amplitude in comparator 12 with a preset voltage level of the ramp voltage generated by ramp generator 13, comparator 12 generates the pulses shown in the signal of FIG. 5(E). These pulses trigger front transmitter 15 to, in turn, cause front transducer 17 to broadcast a CW signal of preset frequency, similar to that portrayed by FIG. 5(F), toward the sea bottom at angle $\phi$.

Again, to insure understanding of a key factor of this invention, it is mentioned that voltage T is proportional to the altitude and speed of the carrier vehicle at any given instant and is, thus, proportional to the time delay necessary between the broadcasts by the rear and front transducers, in order for the broadcast directivity patterns thereof to impact in a grazing manner on the same spot 69 on the sea floor, since grazing angle $\phi$ is greater than grazing angle $\theta$.

Due to the aforesaid analog computer computations, the grazed sea floor reflections of the aforesaid differently timed broadcasts are received by front and rear receivers 18 and 23 at the same time. Hence, their respective envelope appearances, as they emanate from front and rear receivers 18 and 23 may, for example, be similar to the intensities and waveforms illustrated in FIGS. 5(G) and 5(H).

Due to the fact that the aforesaid pair of grazed sea bottom reflection signals are received substantially simultaneously from the same spot, the difference thereof obtained by subtracting one from the other produces an indication of gradient of sea bottom scattering vs. grazing angle, which, in turn, constitutes a measure of sea bottom hardness. This function is effected by subtract circuit 24, to thereby produce a signal similar to that shown in FIG. 5(I).

To further remove spurious noise and other unwanted variations from the output of subtract circuit 24, the signal illustrated in FIG. 5(H) is smoothed by averaging circuit 25. After being so smoothed, it becomes an analog signal that acquires an appearance similar to that depicted in FIG. 5(J) and, thus, is continuously indicative of the information actually indicated and/or recorded by readout 26. Of course, readout 26 must be calibrated to make the intelligence information read out thereby correspond to whatever indicia is employed for said readout, so as to thereby make it understandable to human or other operators. Ordinarily, said information is read out in terms of hardness or grain size of the composition from which many useful inferences may be drawn, including, for example, possible sonar penetration capabilities of a particular sea floor sample or perhaps an object of unusual hardness or geometrical configuration laying thereon or buried or partially buried therein.

From the foregoing, it may readily be seen that the subject system determines a number of parametric values which are useful in sonar, oceanographic, ecological, and other scientific disciplines. And the improved accuracy thereof causes it to be a considerable improvement over any known prior art.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A material analyzer, comprising in combination:
   means for timely broadcasting a first signal toward the surface of the material to be analyzed in such manner that the directivity pattern thereof makes a first grazing angle therewith;
   means for timely broadcasting a second signal toward the surface of the material to be analyzed in such manner that the directivity pattern thereof makes a second grazing angle therewith that is different from the aforesaid first grazing angle;
   means for receiving the echoes of said first and second signals after they have been reflected from the surface of said material to be analyzed at their respective grazing angles;
   means connected to said first and second signal broadcasting means for timing the broadcast of one with respect to the broadcast of the other in such manner as to effect the simultaneous reception of the ehcoes of said first and second signals by said receiving means after they have been reflected from the same spot on the surface of the material being analyzed, regardless of the distance and relative velocity between the surface of said material and said broadcasting and receiving means, and regardless of the respective degrees of said first and second grazing angles; and
   means effectively connected to the output of said receiving means for reading out the difference of the intensities of the echoes of said first and second signals in terms of predetermined parameters.

2. The device of claim 1 wherein said means for receiving the echoes of said first and second signals after they have been reflected from the surface of said material to be analyzed at their respective grazing angles, comprises:
   a pair of transducers; and
   a pair of receivers connected to the outputs of said pair of transducers, respectively.

3. The device of claim 1 wherein said means connected to said first and second signal broadcasting means for timing the broadcasting of one with respect to the broadcast of the other in such manner as to effect the simultaneous reception of the echoes of said first and second signals by said receiving means after they have been reflected from the same spot on the surface of the material being analyzed, comprises:
  an astable multivibrator, with the output thereof connected to the input of said first signal broadcasting means;
  a ramp generator connected to the output of said astable multivibrator; and
  a comparator having a pair of inputs and an output, with one of the inputs thereof connected to the output of said ramp generator, with the other input thereof adapted for being responsive to a predetermined input analog signal, and the output thereof connected to the input of said second signal broadcasting means.

4. The device of claim 1 wherein said means effectively connected to the output of said receiving means for reading out the difference of the intensities of the ehoes of said first and second signals in terms of predetermined parameters, comprises:
  a subtract circuit connected to the outputs of said receiving means; and
  a readout connected to the output of said subtract circuit.

5. The device of claim 1 wherein said means effectively connected to the output of said receiving means for reading out the difference of the intensities of the echoes of said first and second signals in terms of predetermined parameters, comprises:
  a subtract circuit connected to the outputs of said receiving means;
  a signal averaging circuit connected to the output of said subtract circuit; and
  a readout connected to the output of said signal averaging circuit.

6. The device of claim 1 wherein said means connected to said first and second signal broadcasting means for timing the broadcast of one with the respect to the broadcast of the other in such manner as to effect the simultaneous reception of the echoes of said first and second signals by said receiving means after they have been reflected from the same spot on the surface of the material being analyzed, regardless of the distance and relative velocity between the surface of said material and said broadcasting and receiving means, and regardless of the respective degrees of said first and second grazing angles, comprises:
  an astable multivibrator, with the output thereof connected to the input of said first signal broadcasting means;
  a ramp generator connected to the output of said astable multivibrator;
  a comparator having a pair of inputs and an output, with one of the inputs thereof connected to the output of said ramp generator, and with the output thereof connected to the input of the aforesaid second signal broadcasting means; and
  an analog computer having a plurality of inputs and an output, with said plurality of inputs being responsive to a like plurality of predetermined parametric signals, and with the output thereof connected to the other input of the aforesaid comparator.

7. The invention of claim 1 further characterized by a carrier vehicle connected to said material anaylzer in such manner as to provide a mobile platform therefor.

8. The invention of claim 1 further characterized by:
  a carrier vehicle connected to said material analyzer in such manner as to provide a mobile platform therefor; and
  an attitude stabilization means connected to said carrier vehicle for effecting the stabilization thereof in pitch, roll, and yaw.

9. The invention of claim 1 further characterized by:
  a carrier vehicle connected to said material analyzer for providing a supporting platform therefor; and
  a tractor vehicle connected to said carrier vehicle in such manner as to effect the movement thereof along a predetermined course.

10. The invention of claim 1 further characterized by:
  a carrier vehicle connected to said material analyzer in such manner as to provide a mobile platform therefor;
  means connected to said carrier vehicle for effecting the stablization thereof in pitch, roll, and yaw; and
  means connected to the aforesaid carrier vehicle for effecting the movement thereof relative to the material to be analyzed.

11. The device of claim 1 wherein said means for timely broadcasting a first signal toward the surface of the material to be anaylzied in such manner that the directivity pattern thereof makes a first grazing angle therewith, comprises:
  a first transmitter; and
  a first transducer connected to the output of said first transmitter.

12. The device of claim 11, wherein said material anaylzer is a sea floor analyzer and wherein said first transducer is an electroacoustical transducer.

13. The deivce of claim 11 wherein said means for timely broadcasting a second signal toward the surface of the material to be analyzed in such manner that the directivity pattern thereof makes a second grazing angle therewith that is different from the aforesaid first grazing angle comprises:
  a second transmitter; and
  a second transducer connected to the output of said second transmitter.

14. The device of claim 13 wherein said material analyzer is a sea floor analyzer and said second transducer is an electroacoustical transducer.

15. A system for analyzing the hardness and composition of a sea floor, comprising in combination:
  a carrier vehicle for supporting said sea floor analyzing system;
  an astable multivibrator;
  a first transmitter connected to the output of said astable multivibrator;
  a first transmit-receive switch connected to the output of said first transmitter;
  a first electroacoustical transducer connected to said transmit-receive switch;
  a first receiver connected to the output of said first transmit-receive switch;
  a ramp generator connected to the output of said astable multivibrator;
  a comparator having a pair of inputs and an output, with one of the inputs thereof connected to the output of said ramp generator;
  a second transmitter connected to the output of said comparator;

a second transmit-receive switch connected to the output of said second transmitter;

a second electroacoustical transducer connected to transmit-receive switch;

a second receiver connected to the output of said transmit-receive switch;

a subtractor circuit having a pair of inputs and an output, with one of the inputs thereof connected to the output of said first receiver, and with the other input thereof connected to the output of said second receiver;

a voltage averaging circuit connected to the output of said subtractor circuit;

a readout connected to the output of said voltage averaging circuit;

a first signal generator mounted on said carrier vehicle for producing a first analog signal representing the altitude of said carrier vehicle above said sea floor;

a second signal generator mounted on said carrier vehicle for producing a second analog signal representing the sine of the angle between the longitudinal axis of said carrier vehicle and the directivity pattern of the aforesaid first electroacoustical transducer;

a third signal generator mounted on said carrier vehicle for producing a third analog signal representing the tangent of the angle between the longitudinal axis of said vehicle and the directivity pattern of the aforesaid first electroacoustical transducer;

a fourth signal generator mounted on said carrier vehicle for producing a fourth analog signal representing the sine of the angle between the longitudinal axis of said carrier vehicle and the directivity pattern of the aforesaid second electroacoustical transducer;

a fifth signal generator mounted on said carrier vehicle for producing a fifth analog signal representing the velocity of sound in sea water;

a sixth signal generator mounted on said carrier vehicle for producing a sixth positive analog signal that represents, in magnitude, the distance between the aforesaid first and second electroacoustical transducers;

a seventh signal generator mounted on said carrier vehicle for producing a seventh negative analog signal that represents, in magnitude, the distance between said first and second electroacoustical transducers;

an eighth signal generator mounted on said carrier vehicle for producing an eighth analog signal that represents the velocity thereof at any given instant;

a ninth signal generator mounted on said carrier vehicle for producing a ninth analog signal representing the tangent of the angle between the horizontal axis of said carrier vehicle and the directivity pattern of the aforesaid second electroacoustical transducer;

a first inverter connected to the output of said second signal generator;

a second inverter connected to the output of said fourth signal generator;

a second subtract circuit connected to the outputs of said first and second inverters for subtracting the output signal of said second inverter from the output signal of said first inverter;

a first multiplier having a pair of inputs and an output, with one of the inputs thereof connected to the output of said second subtract circuit, and with the other input thereof connected to the output of the aforesaid first signal generator;

a third inverter connected to the output of said fifth signal generator;

a second multiplier having a pair of inputs and an output, with one of the inputs thereof connected to the output of said third inverter, and with the other input thereof connected to the output of said first multiplier;

a third multiplier having a pair of inputs and an output, with one of the inputs thereof connected to the output of the aforesaid first signal generator;

a thresholder connected to the output of said first signal generator;

a first switch having a pair of data signal inputs, a control input, and an output, with the control input thereof connected to the output of said thresholder, and with the output thereof connected to the other input of the aforesaid third multiplier;

a fourth inverter connected to the output of the aforesaid third signal generator;

a fifth inverter connected to the output of the aforesaid ninth signal generator;

a third subtract circuit having a pair of inputs and an output, with one of the inputs thereof connected to the output of said fourth inverter, and with the other input thereof connected to the output of said fifth inverter, for subtracting the output signal of said fourth inverter from the output signal of said fifth inverter, and with the output thereof connected to one of the data signal inputs of the aforesaid first switch;

a fourth subtract circuit having a pair of inputs and an output, with one of the inputs thereof connected to the output of said fourth inverter, and with the other input thereof connected to the output of said fifth inverter, for subtracting the output signal from said fifth inverter from the output signal from said fourth inverter, and with the output thereof connected to the other data signal input of said first switch;

a second switch having a pair of data signal inputs, a control input, and an output, with one of the data signal inputs thereof connected to the output of the aforesaid sixth signal generator, with the other data signal input thereof connected to the output of the aforesaid seventh signal generator, and with the control input thereof connected to the output of said thresholder;

synchronization means connected between said first and second switches for effecting the simultaneous passing of the output signals from said sixth signal generator and said third subtract circuit therethrough, respectively, and for effecting the simultaneous passing of the output signals from said seventh signal generator and said fourth subtract circuit therethrough, respectively;

an algebraic adder circuit having a pair of inputs and an output, with one of the inputs thereof connected to the output of the aforesaid third multiplier, and with the other input thereof connected to the output of said second switch;

a fourth multiplier having a pair of inputs and an output, with one of the inputs thereof connected to the output of said algebraic adder;

a sixth inverter connected between the output of the aforesaid eighth signal generator and the other input of said fourth multiplier; and a second adder having a pair of inputs and an output, with one of the inputs thereof connected to the output of said second multiplier, with the other input thereof connected to the output of said fourth multiplier, and with the output thereof connected to the other input of the aforesaid comparator.

16. The invention of claim 15 further characterized by an attitude stabilizer connected to said carrier vehicle.

17. The invention of claim 15 further characterized by a tractor vehicle connected to said carrier vehicle in such manner as to effect the mobility thereof along a predetermined course.

18. The invention of claim 15 further characterized by: an attitude stabilizer connected to said carrier vehicle; and a tractor vehicle connected to said carrier vehicle.

* * * * *